(12) United States Patent
Kim et al.

(10) Patent No.: US 11,143,499 B2
(45) Date of Patent: Oct. 12, 2021

(54) THREE-DIMENSIONAL INFORMATION GENERATING DEVICE AND METHOD CAPABLE OF SELF-CALIBRATION (71) Applicant: Electronics and Telecommunications Research Institute, Daejeon (KR)

(72) Inventors: Jae Hean Kim, Sejong-si (KR); Hyun Kang, Daejeon (KR); Chang Joon Park, Daejeon (KR); Jin Sung Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/570,264

(22) Filed: Sep. 13, 2019

(65) Prior Publication Data

US 2020/0088508 A1     Mar. 19, 2020

(30) Foreign Application Priority Data

Sep. 18, 2018   (KR) ........................ 10-2018-0111475

(51) Int. Cl.
     *G01B 11/00*          (2006.01)
     *G01B 11/25*          (2006.01)
     (Continued)

(52) U.S. Cl.
     CPC .......... *G01B 11/005* (2013.01); *G01B 11/002* (2013.01); *G01B 11/245* (2013.01);
     (Continued)

(58) Field of Classification Search
     CPC ..... G01B 11/002; G01B 11/005; G01B 11/22; G01B 11/24; G01B 11/2408;
     (Continued)

(56) References Cited

U.S. PATENT DOCUMENTS 4,753,569 A *   6/1988   Pryor ................... A01B 69/008
                                                     250/201.1
4,893,922 A *   1/1990   Eichweber .............. G01S 17/46
                                                     356/3.12
(Continued)

FOREIGN PATENT DOCUMENTS

KR    10-2009-0105199      10/2009
KR    10-2015-0128300      11/2015
(Continued)

OTHER PUBLICATIONS

Jae Hean Kim et al, "Shape Acquisition System Using an Handheld Line Laser Pointer without Markers", Advanced Concepts for Intelligent Vision Systems 2017 (ACIVS), Sep. 18, 2017, pp. 1-12.

*Primary Examiner* — Gordon J Stock, Jr.
(74) *Attorney, Agent, or Firm* — Kile Park Reed & Houtteman PLLC (57) ABSTRACT

The 3D information generating device includes a light source unit configured to irradiate light onto a target object, a coordinate mechanism unit disposed between the target object and the light source unit and including a plurality of inclined projections reflecting the light, a camera unit configured to output an image obtained by simultaneously photographing the coordinate mechanism unit and the target object, and an information processing unit configured to check a projection plane formed by the light of the light source unit and, by using the projection plane, generate 3D information about the target object while calibrating an error. Accordingly, an unskilled user may easily perform a 3D scan operation by using the coordinate mechanism unit, and moreover, since a coordinate mechanism is not installed in the outside, the 3D information generating device may easily move and may be easily maintained and managed.

16 Claims, 6 Drawing Sheets

(51) Int. Cl.
*G06T 7/521* (2017.01)
*G06T 7/593* (2017.01)
*G01B 11/245* (2006.01)
*G06T 7/33* (2017.01)

(52) U.S. Cl.
CPC ...... *G01B 11/2504* (2013.01); *G01B 11/2513* (2013.01); *G01B 11/2518* (2013.01); *G06T 7/33* (2017.01); *G06T 7/521* (2017.01); *G06T 7/593* (2017.01)

(58) Field of Classification Search
CPC ............ G01B 11/2416; G01B 11/2425; G01B 11/245; G01B 11/25; G01B 11/2504; G01B 11/2509; G01B 11/2513; G01B 11/2518; G01B 11/2545; G06T 7/593; G06T 7/514; G06T 7/521; G06T 7/557; G06T 7/73; G06T 2207/10004; G06T 2207/10028; G06T 2207/20068
See application file for complete search history.

(56) References Cited

U.S. PATENT DOCUMENTS

| | | | | |
|---|---|---|---|---|
| 5,085,502 | A * | 2/1992 | Womack | H04N 9/3185 |
| | | | | 348/E9.027 |
| 5,603,318 | A * | 2/1997 | Heilbrun | A61B 5/06 |
| | | | | 600/426 |
| 5,608,847 | A * | 3/1997 | Pryor | B25J 13/088 |
| | | | | 700/248 |
| 6,108,497 | A * | 8/2000 | Nakayama | G01S 17/87 |
| | | | | 348/140 |
| 6,256,099 | B1 * | 7/2001 | Kaufman | G01B 11/2545 |
| | | | | 356/603 |
| 6,460,004 | B2 * | 10/2002 | Greer | G01B 11/00 |
| | | | | 356/152.3 |
| 7,180,607 | B2 * | 2/2007 | Kyle | G01S 7/497 |
| | | | | 356/614 |
| 7,567,697 | B2 * | 7/2009 | Mostafavi | A61B 6/463 |
| | | | | 382/131 |
| 7,860,298 | B2 * | 12/2010 | Leikas | G06T 7/593 |
| | | | | 382/154 |
| 7,876,455 | B2 * | 1/2011 | Kawasaki | G01B 11/2513 |
| | | | | 356/607 |
| 8,571,637 | B2 * | 10/2013 | Sheffer | A61B 34/20 |
| | | | | 600/424 |
| 8,989,897 | B2 * | 3/2015 | de Smet | B25J 9/1692 |
| | | | | 700/245 |
| 9,014,999 | B2 * | 4/2015 | Turbell | G01B 11/2504 |
| | | | | 702/104 |
| 9,519,976 | B1 * | 12/2016 | Saltzman | H05B 45/22 |
| 10,323,927 | B2 * | 6/2019 | Stigwall | G01B 11/2504 |
| 10,547,796 | B2 * | 1/2020 | Chang | G06T 7/73 |
| 10,657,665 | B2 * | 5/2020 | Kim | G06T 7/514 |
| 2002/0024593 | A1 | 2/2002 | Bouguet et al. | |
| 2006/0055943 | A1 | 3/2006 | Kawasaki et al. | |
| 2011/0149068 | A1 | 6/2011 | Son et al. | |
| 2017/0066193 | A1 | 3/2017 | Kim et al. | |
| 2019/0162529 | A1 | 5/2019 | Lee | |

FOREIGN PATENT DOCUMENTS

| | | | | |
|---|---|---|---|---|
| KR | 10-2017-0128736 | | 11/2017 | |
| WO | WO-2009120073 | A2 * | 10/2009 | ......... G01B 11/2518 |

* cited by examiner

THREE-DIMENSIONAL INFORMATION GENERATING DEVICE AND METHOD CAPABLE OF SELF-CALIBRATION

CROSS-REFERENCE TO RELATED APPLICATIONS

This application claims priority under 35 U.S.C. § 119 to Korean Patent Application No. 10-2018-0111475, filed on Sep. 18, 2018, the disclosure of which is incorporated herein by reference in its entirety.

TECHNICAL FIELD

The present invention relates to a three-dimensional (3D) information generating device and method capable of self-calibration, and more particularly, to a 3D information generating device and method capable of self-calibration, which obtain 3D appearance information about an object through a combination of a light source and a camera.

BACKGROUND 3D scan technology is technology which irradiates a laser beam or white light onto a target object and photographs an irradiation scene with a camera to obtain 3D appearance information about the target object.

Equipment such as a coordinate measuring machine (CMM) for bringing a machine into contact with a surface of a target object to detect 3D positions of all surface points through a manual operation has been used before the 3D scan technology is developed. However, such a method expends a long time and uses a mechanical type, and due to this, it is difficult to maintain and manage equipment.

On the other hand, an optical 3D scanner using a camera may conveniently obtain a result for a short time, and moreover, a configuration thereof is relatively simpler than a mechanical type. Therefore, it is easy to maintain and manage the optical 3D scanner.

Moreover, optical 3D scan technology has been actively used in the fields such as reverse engineering and quality management in industry. Recently, however, as 3D printers are supplied, requirements and interest in 3D scanners has increased in the fields such as education, medicine, entertainment, and distribution. Therefore, the necessity of the 3D scanners is increasing so that unskilled users purchase a 3D scanner at low cost and easily perform a 3D scan operation.

PRIOR ART REFERENCE

[Patent Document]
Korean Patent Registration No. 10-0956701 (Apr. 29, 2010)
Korean Patent Publication No. 10-2017-0128736 (Nov. 23, 2017)

SUMMARY

Accordingly, the present invention provides a 3D information generating device and method capable of self-calibration, which enable an unskilled user to easily perform a 3D scan operation by using a simply configured coordinate mechanism unit.

The present invention also provides a 3D information generating device and method capable of self-calibration, which allow a coordinate mechanism unit scanning an object to be automatically calibrated, thereby enhancing a degree of precision.

In one general aspect, a three-dimensional (3D) information generating device capable of self-calibration includes: a light source unit configured to irradiate light onto a target object; a coordinate mechanism unit disposed between the target object and the light source unit, the coordinate mechanism unit including a plurality of inclined projections (inclined protrusions) reflecting the light; a camera unit configured to output an image obtained by simultaneously photographing the coordinate mechanism unit and the target object; and an information processing unit configured to check a projection plane formed by the light of the light source unit and, by using the projection plane, generate 3D information about the target object while calibrating an error.

In another general aspect, a three-dimensional (3D) information generating method capable of self-calibration includes: obtaining an image by simultaneously photographing a target object, having 3D information which is to be restored, and a coordinate mechanism unit which is provided between the light source unit and the target object and includes a plurality of projections reflecting light irradiated from the light source unit; checking coordinates of a plurality of projection reflection points where the light is reflected by the plurality of projections in the image; and checking a projection plane formed by the light, based on a relationship between the plurality of projection reflection points in the image and real projection reflection points reflected to a plurality of real projections and, by using the projection plane, generating 3D information about the target object while calibrating an error.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
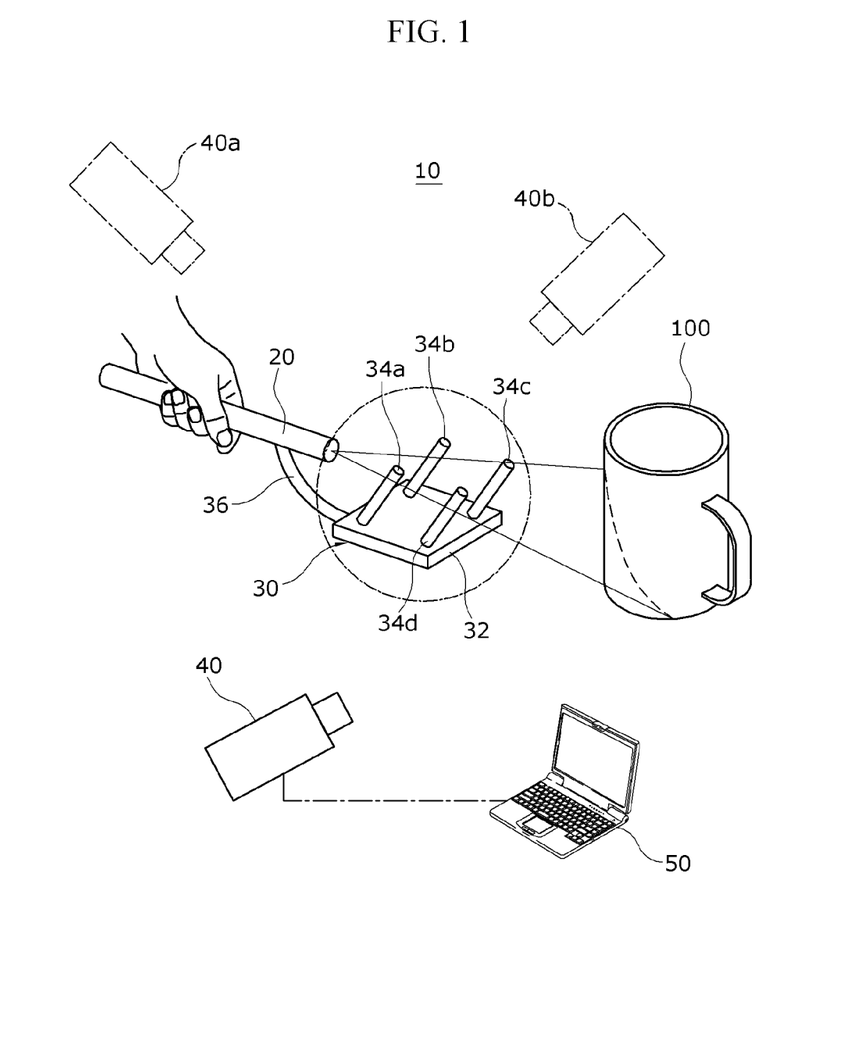
FIG. 1 is a diagram illustrating a configuration of a 3D information generating device capable of self-calibration according to an embodiment of the present invention.

FIG. 1 is a diagram illustrating a configuration of a 3D information generating device 10 capable of self-calibration according to an embodiment of the present invention.

Referring to FIG. 1, the 3D information generating device 10 capable of self-calibration according to an embodiment of the present invention may include a light source unit 20, a coordinate mechanism unit 30, a camera unit 40, and an information processing unit 50.

The light source unit 20 may irradiate light onto a target object 100 having 3D information which is to be restored.

Moreover, the light source unit 20 may include at least one laser device for outputting a line laser beam and at least one pattern laser device for outputting a laser beam having a predetermined pattern.

In this case, the light source unit 20 may be configured to simultaneously irradiate two or more laser beams.

The coordinate mechanism unit 30 may be provided between the light source unit 20 and the target object 100.

Moreover, the coordinate mechanism unit 30 may include a fixing plate 32 which is provided to have a certain size and a plurality of inclined projections 34a to 34d which are arranged at certain intervals on the fixing plate 32 and reflect light irradiated from the light source unit 20.

Here, the inclined projections 34a to 34d may be disposed in a tetragonal shape on the fixing plate 32 and may be inclined at a certain angle. Also, the inclined projections 34a to 34d may be used to set a criterion of coordinates in a case where the light source unit 20 irradiates the light.

In this case, positions and arrangement of the inclined projections 34a to 34d may be modified based on a coordinate setting manner.

Moreover, the coordinate mechanism unit 30 may include a fixing arm 36 which is coupled to the light source unit 20 at one end of the fixing arm 36 and is coupled to the fixing plate 32 of the coordinate mechanism unit 30 at the other end of the fixing arm 36, so that positions of the fixing plate 32 and the inclined projections 34a to 34d are easily set between the coordinate mechanism unit 30 and the light source unit 20.

The fixing arm 36 may selectively use a known connection member such as a string or a wire known to those skilled in the art, so as to easily adjust the position of the light source unit 20.

The camera unit 40 may include a lens array and an image sensor and may generate and provide a two-dimensional (2D) image 200.

That is, the camera unit 40 may capture the image 200 including the coordinate mechanism unit 30 and the target object 100 and may provide the captured image 200 to the information processing unit 50.

Here, the image 200 including the coordinate mechanism unit 30 and the target object 100 may be used as data which is based on generating 3D information.

In this case, since images of the target object 100 captured in different directions or at different positions are needed for more accurately generating 3D information about the target object 100, the camera unit 40 may be provided in plurality, and the plurality of camera units 40 may be arranged in different directions.

For example, when the camera unit 40 is provided as three, the three camera units 40 may include first to third camera units 40, 40a, and 40b. In this case, the first camera unit 40 provided in a first direction may capture a first image and may provide the first image to the information processing unit 50, the second camera unit 40a provided in a second direction may capture a second image and may provide the second image to the information processing unit 50, and the third camera unit 40b provided in a third direction may capture a third image and may provide the third image to the information processing unit 50, thereby more accurately generating the 3D information.

In this case, an example where the first to third camera units 40, 40a, and 40b use the same camera device and are disposed at different positions is illustrated.

As another example, the first to third camera units 40, 40a, and 40b may be different camera devices, and the first to third camera units 40, 40a, and 40b may provide the information processing unit 50 with the first to third images captured at the same time, respectively.

Moreover, each of the first to third camera units 40, 40a, and 40b may photograph the light source unit 20, the coordinate mechanism unit 30, and the target object 100 to output digital images thereof.

That is, the first to third camera units 40, 40a, and 40b may be small camera devices easy to carry and may include a general digital camera device, a camera device included in a mobile device, and an action camera (a sports and action camera).

The information processing unit 50 may include a storage medium, storing a program code for executing a program which generates 3D information, and an electronic device including at least one processor which executes the program code.

In this case, the information processing unit 50 may be included in a camera device including the first to third camera units 40, 40a, and 40b, or may be included in a separate electronic device.

Particularly, the information processing unit 50 may set 3D reference coordinates based on a plurality of inclined projection reflection points, from which the light is reflected by the plurality of inclined projections 30, in the image 200 including the coordinate mechanism unit 30 and the target object 100 and may generate 3D information about the target object 100 with reference to the 3D reference coordinates, thereby calibrating an error.

Hereinafter, an operation of generating, by the information processing unit 50, 3D information about a target object will be described in detail.

Figure 2:
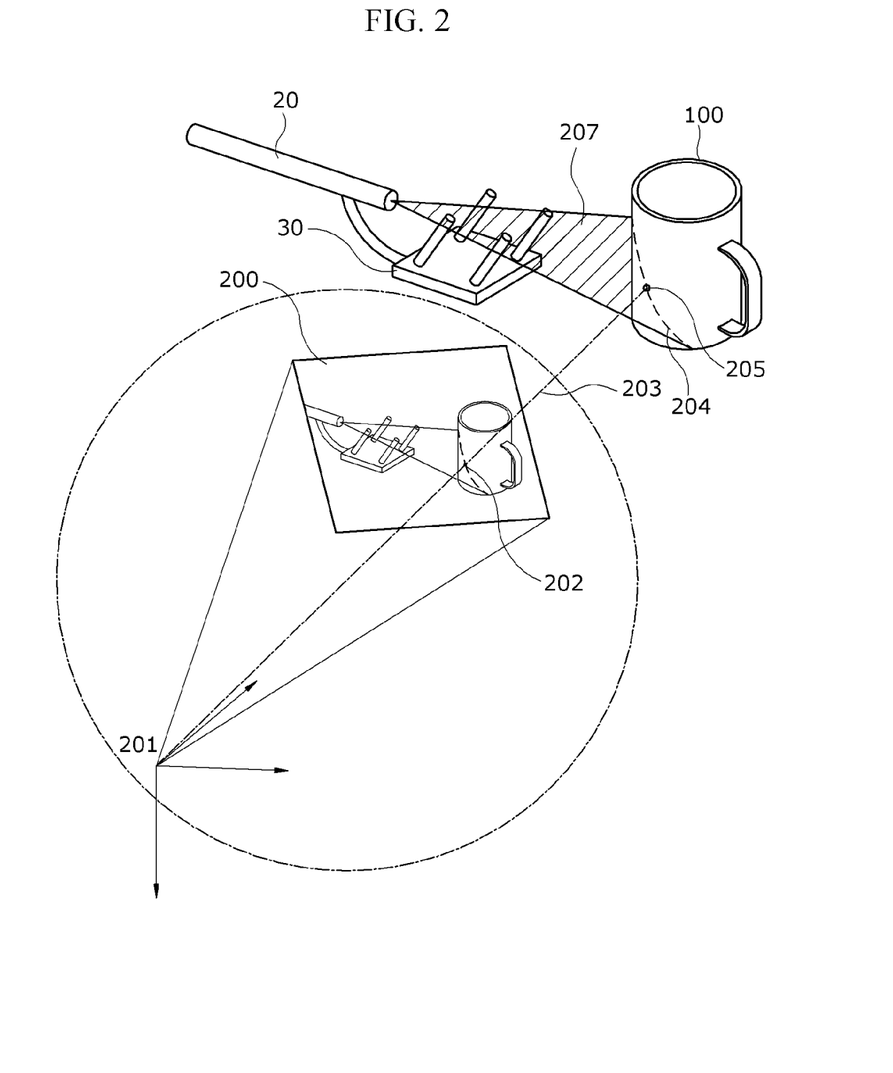
FIG. 2 is a diagram illustrating the principle of calculating a 3D point of a profile by using an image obtained through a 3D information generating device capable of self-calibration according to an embodiment of the present invention.

FIG. 2 is a diagram illustrating a relationship between some elements included in a 3D information generating device capable of self-calibration according to an embodiment of the present invention and an image captured by a camera included in the 3D information generating device capable of self-calibration.

Based on a pinhole camera model, a straight line (hereinafter referred to as a projection line) 203 passing through an arbitrary point 202 through which a line laser passes in an image 200 may extend with reference to an original point 201 of a camera coordinate system.

Light emitted by the line laser may form a projection plane 207, and as the projection plane 207 reaches a target object 100, a projection curve 204 of the line laser may be formed along an outer region of the target object 100.

At this time, an intersection point 205 of the straight line 203 and the projection plane 207 may be checked and may be determined as one point of a surface of the target object 100.

Based on this, the information processing unit 50 may check points through which the line laser passes in the image 200 and may check an intersection point corresponding to the points to detect coordinates corresponding to a point of a surface of the target object 100.

For example, the information processing unit 50 may define the arbitrary point 202, through which the line laser passes in the image 200, as [u v] and may calculate a direction vector of the straight line 203 passing through the arbitrary point 202 as in the following Equation (1):

$$d \cong K^{-1}[u\ v\ 1]^T \tag{1}$$

where K denotes a camera internal parameter matrix, and the camera internal variable matrix may be previously set based on a general camera calibration method.

Moreover, a value of the arbitrary point 202 through which the line laser passes in the image 200 may be reflected in a distortion rate of a lens included in a camera unit, and thus, may be calibrated.

The information processing unit 50 may calculate the projection plane 207, formed by the light emitted by the line laser, from the image 200 on the basis of the camera coordinate system.

Hereinafter, an operation of calculating, by the information processing unit 50, the projection plane 207 will be described in detail.

Figure 3:
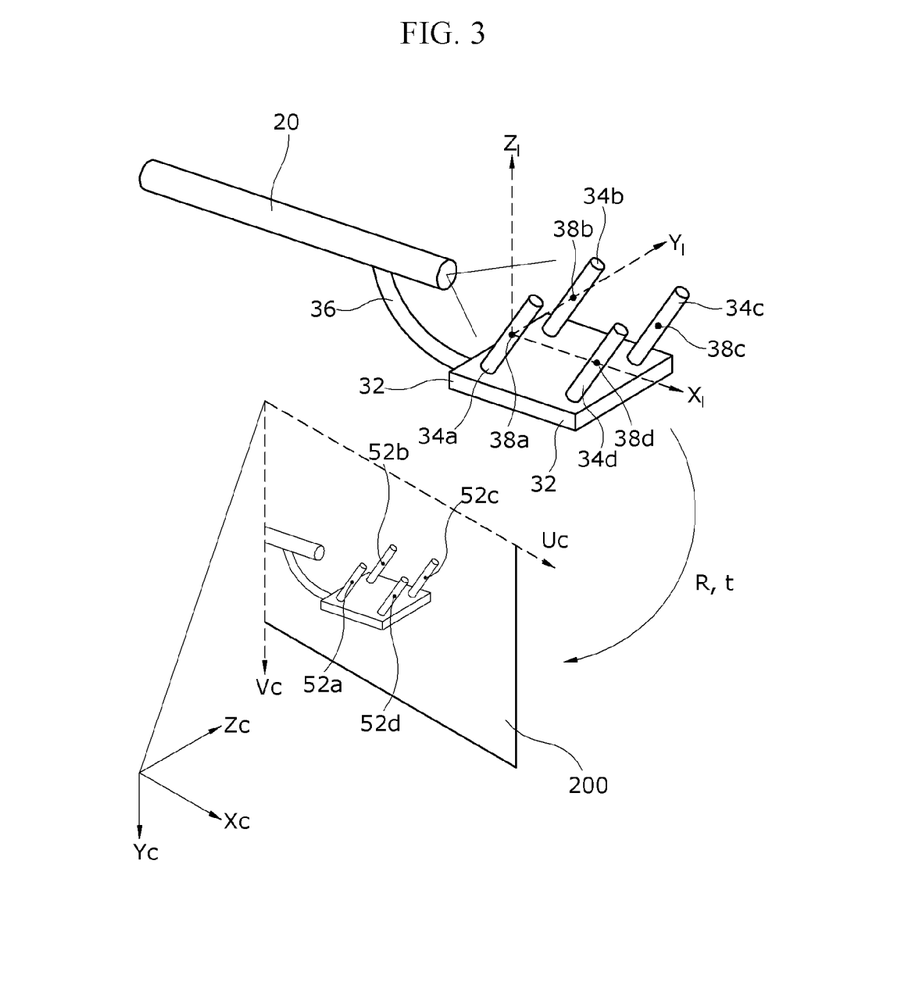
FIG. 3 is a diagram illustrating a process of irradiating light onto a mechanism unit provided in front of a light source unit according to an embodiment of the present invention and an enlarged camera image of a corresponding portion.

FIG. 3 is a diagram illustrating a relationship between a plurality of real projection reflection points, from which light emitted by a 3D information generating device capable of self-calibration according to an embodiment of the present invention is reflected, and a plurality of projection reflection points displayed on an image.

A laser beam output from the light source unit 20 may form a projection plane 207. The projection plane 207 formed by the laser beam may use a plurality of projection reflection points 38a to 38d reflected to a plurality of inclined projections 34a to 34d included in the coordinate mechanism unit 30, for accurately checking a position at which the laser beam is emitted and a direction in which the laser beam is irradiated.

The information processing unit 50 may calculate the projection plane 207, based on a relationship between real positions of the projection reflection points 38a to 38d reflected to the plurality of inclined projections 34a to 34d and projection reflection points 52a to 52d extracted from an image 200.

In detail, as illustrated in FIG. 3, the information processing unit 50 may set virtual coordinates $(X_I, Y_I, Z_I)$ corresponding to the coordinate mechanism unit 30, based on a real space.

The information processing unit 50 may set an original point in one of the projection reflection points 38a to 38d reflected to the plurality of inclined projections 34a to 34d and may set an X axis and a Y axis on a plane configured by the other points.

In this case, when the projection plane 207 is parallel to the fixing plate 32, the information processing unit 50 may obtain 3D coordinates ($[X_i\ Y_i\ 0]$, i=0, 1, 2, 3) corresponding to projection reflection points on the plurality of inclined projections 34a to 34d, based on a structure of the coordinate mechanism unit 30.

However, in a case where the light source unit 20 and the coordinate mechanism unit 30 are provided, when the projection plane 207 is not parallel to the fixing plate 32 due to a process error and deformation caused by use (i.e., when an error occurs), the error may be calibrated. An error calibrating method will be described below.

The information processing unit 50 may extract the projection reflection points 38a to 38d from the image 200 and may set 2D coordinates $[u_i\ v_i]$ (i=0, 1, 2, 3) corresponding to each of the projection reflection points 38a to 38d with respect to a coordinate system [uc, vc]. In the apparatus for generating three-dimensional information according to the embodiment of the present disclosure, a point $[xi\ yi\ 1]^T(K^{-1}[ui\ vi\ 1]^T)$ on the normalized image 200 plane can be expressed by the following equation 2.

The information processing unit 50 may express a point $[x_i\ y_i]^T(K^{-1}[u_i\ v_i\ 1]^T)$ of a normalized image 200 plane as in the following Equation (2):

$$[x_i\ y_i\ 1]^T \cong H[X_i\ Y_i\ 1]^T \tag{2}$$

where H denotes a homography 3×3 matrix and may be calculated from $[X_i\ Y_i\ 0]$ (i=0, 1, 2, 3) and $[u_i\ v_i]$ (i=0, 1, 2, 3).

In this case, H may be expressed as the following Equation (3) by using a rotation matrix ($R=[r_0\ r_1\ r_2]$) and a translation vector (t) between two coordinate systems $[X_I\ Y_I\ Z_I]$ and $[X_C\ Y_C\ Z_C]$.

$$H=[r_0\ r_1\ t_3] \tag{3}$$

The information processing unit 50 may calculate the rotation matrix ($R=[r_0\ r_1\ r_2]$) and the translation vector (t) from H by using Equation (3). Furthermore, the information processing unit 50 may set the calculated rotation matrix ($R=[r_0\ r_1\ r_2]$) and translation vector (t) to an initial value so as to enhance a degree of precision and may calculate the rotation matrix ($R=[r_0\ r_1\ r_2]$) and the translation vector (t) by using a nonlinear optimization method, based on a cost function of the following Equation (4):

$$\sum_{i=0}^{3} \|[x_i,y_i]^T - \pi([r_0 r_1 t][X_i Y_i 1]^T)\|^2 \tag{4}$$

Herein $\pi([a\ b\ c]^T)$ is a function defined as $[a/c\ b/c]^T$

When $r_2=[r_{02}\ r_{12}\ r_{22}]^T$ and $t=[t_x\ t_y\ t_z]^T$ are assumed, an Xl-Yl plane equation may be calculated from the rotation matrix ($R=[r_0\ r_1\ r_2]$) and the translation vector (t) as in the following Equation (5):

$$r_{02}(x-t_x)+r_{12}(y-t_y)+r_{22}(z-t_z)=0 \tag{5}$$

The projection reflection points 38a to 38d may be formed by bringing the plurality of inclined projections 34a to 34d into contact with the projection plane 207, and thus, the plane equation expressed as Equation (5) may match an expression equation of the projection plane 207.

Therefore, the information processing unit 50 may calculate an intersection point 205 of the projection line 203 and the projection plane 207 by using Equation (5) corresponding to the expression equation of the projection plane 207 and Equation (1) representing a direction vector of the projection line 203 passing through an arbitrary point 202. Such a process may be performed on all laser points projected onto the image 200 of the projection curve 204 based on a laser beam, thereby obtaining a set of 3D points on the projection curve 204.

The information processing unit 50 may repeatedly perform an operation, which calculates 3D coordinates of the projection curve 204, on continual images which are obtained when a laser source irradiates a laser beam onto a target object while moving, thereby calculating a 3D scan result representing an appearance of the target object.

Hereinabove, a case where the light source unit 20 is parallel to a standard mechanism unit 30 (i.e., a case where the projection plane 207 is parallel to the fixing plate 32 has been described.

As described above, when an error occurs due to a process error and/or deformation, an accurate 3D scan result corresponding to an appearance of a target object may be calculated by calibrating the error.

Hereinafter, a method of scanning an appearance of a target object when the light source unit 20 is not parallel to the standard mechanism unit 30 will be described. Such a description may be applied to a process of calibrating an error.

Figure 4:
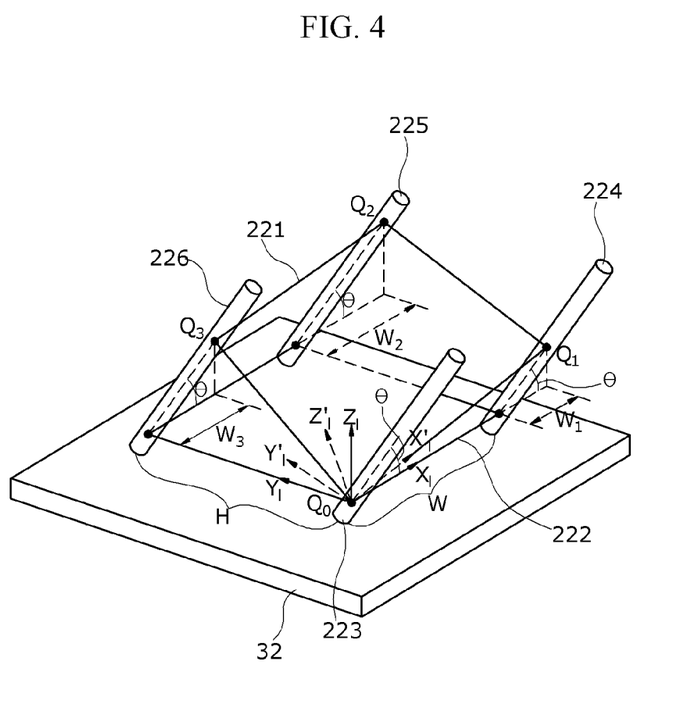
FIG. 4 is a diagram for describing error calibration between a light source unit and a standard mechanism unit in a 3D information generating device capable of self-calibration according to an embodiment of the present invention.

FIG. 4 is a diagram for describing error calibration between a light source unit and a standard mechanism unit in a 3D information generating device capable of self-calibration according to an embodiment of the present invention.

Here, two projection planes (for example, a first projection plane and a second projection plane) 221 and 222 are illustrated, and the first projection plane (or a real projection plane) 221 may be a projection plane formed by real reflection points $Q_0$ to $Q_3$ formed by projections 223 to 226 based on light emitted from a light source unit (not shown) and may be a projection plane in a state where the light source unit is not parallel to a standard mechanism unit 30.

The second projection plane (or a reference projection plane) 222 may be a virtual projection plane for description and may be a projection plane in a state where the light source unit is parallel to the standard mechanism unit 30, and it may be assumed that virtual reflection points (reference reflection points) $Q_4$ to $Q_6$ forming the second projection plane 222 are formed by second to fourth projections 224 to 226.

That is, when the light source unit is parallel to the standard mechanism unit 30, the second projection plane 222 may be formed, or when the light source unit is not parallel to the standard mechanism unit 30 due to an error, the first projection plane 221 differing from the second projection plane 222 may be formed.

For description, it may be assumed that a first reflection point $Q_0$ formed by a first projection 223 is a reflection point common to the first projection plane 221 and the second projection plane 222.

That is, the first reflection point $Q_0$ may be a reflection point in a state where the light source unit is parallel to the standard mechanism unit 30.

As the light emitted from the light source unit is reflected by the first to fourth projections 223 to 226, first to fourth real reflection points $Q_0$ to $Q_3$ may be formed in the projections 223 to 226, and the real projection plane 221 may be formed by the real reflection points $Q_0$ to $Q_3$.

In the present embodiment, an example where the first to fourth projections 223 to 226 are disposed in a corner side of a tetragonal fixing plate 32 where a height is H and a width is W is described. However, a shape of the fixing plate 32 and positions of the projections 223 to 226 may be variously modified.

The first to fourth projections 223 to 226 may be inclined at a certain angle (θ) in the same direction as a direction in which light is output to the fixing plate 32, and in this case, may be provided vertical to the fixing plate 32.

Since the first real reflection point $Q_0$ is a reflection point common to the real projection plane 221 and the virtual projection plane 222, there is no offset of the first real reflection point $Q_0$.

However, since the second to fourth real reflection points $Q_1$ to $Q_3$ are reflection points formed by an error, offsets $W_1$ to $W_3$ of the second to fourth real reflection points $Q_1$ to $Q_3$ may be provided with respect to the reference reflection points $Q_4$ to $Q_6$.

In the present embodiment, an offset may be a horizontal distance difference value between a reference reflection point and a real reflection point in a projection, and $W_1$ to $W_3$ may be error offsets of the second to fourth real reflection points $Q_1$ to $Q_3$.

That is, $W_1$ may be an error offset of the second real reflection point $Q_1$ in the second projection 224, $W_2$ may be an error offset of the third real reflection point $Q_2$ in the third projection 225, and $W_3$ may be an error offset of the fourth real reflection point $Q_3$ in the fourth projection 226.

By using an inclined angle (θ) and the error offsets $W_1$ to $W_3$, coordinates in a coordinate system $X_I Y_I Z_I$ of the first to fourth real reflection points $Q_0$ to $Q_3$ may be expressed as in the following Equation (6):

$$Q_0 = \begin{bmatrix} 0 \\ 0 \\ 0 \end{bmatrix}, \quad (6)$$

$$Q_1 = \begin{bmatrix} W + W_1 \\ 0 \\ \tau W_1 \end{bmatrix},$$

$$Q_2 = \begin{bmatrix} W + W_2 \\ H \\ \tau W_2 \end{bmatrix},$$

$$Q_3 = \begin{bmatrix} W_3 \\ H \\ \tau W_3 \end{bmatrix}$$

where $\tau = \tan(\theta)$

The first to fourth projections 223 to 226 may all be parallel to one another, and thus, may be expressed as in the following Equation (7):

$$W_2 = W_1 + W_3 \quad (7)$$

When the coordinate mechanism unit 30 moves in front of the camera unit 40 for a certain time, coordinates $(q_j^i)$ of a reflection point in each image frame may be obtained, and by substituting Equation (6) into a nonlinear optimization equation such as the following Equation (8), the error offsets $W_1$ to $W_3$ may be obtained. Accordingly, coordinates of the first to fourth real reflection points $Q_0$ to $Q_3$ in a projection may be obtained:

$$\min_{\hat{R}_i, \hat{t}_i, W_1, W_3} \sum_{i=0}^{N} \sum_{j=0}^{3} \|q_j^i - \hat{q}_j^i(\hat{R}_i, \hat{t}_i, Q_j)\|^2 \qquad (8)$$

where i denotes a frame number, j denotes an index of a real reflection point in a projection, an initial value of $(\hat{R}_i, \hat{t}_i)$ uses a result calculated through Equation (5), and an initial value of each of $W_1$ and $W_3$ is set to 0.

The error offsets $W_1$ to $W_3$ may be obtained by substituting Equation (6) into Equation (8), and thus, a relationship between the real projection plane 221 and the virtual projection plane 222 may be set. When a new coordinate system $X'_I Y'_I Z'_I$ is defined for calculating coordinates of the real reflection points $Q_0$ to $Q_3$, coordinates $\{Q_0, Q_1, Q_2, Q_3\}$ may be obtained in the coordinate system $X'_I Y'_I Z'_I$.

When the coordinates $\{Q_0, Q_1, Q_2, Q_3\}$ in the coordinate system are applied to Equations (2) and (5), a more precise 3D scan result may be obtained.

For description, it may be assumed that the first to fourth projections 223 to 226 are disposed in the corner side of the tetragonal fixing plate 32 where the height is H and the width is W. However, when the projections 223 to 226 are parallel to one another, the assumption may be applied as-is.

Figure 5:
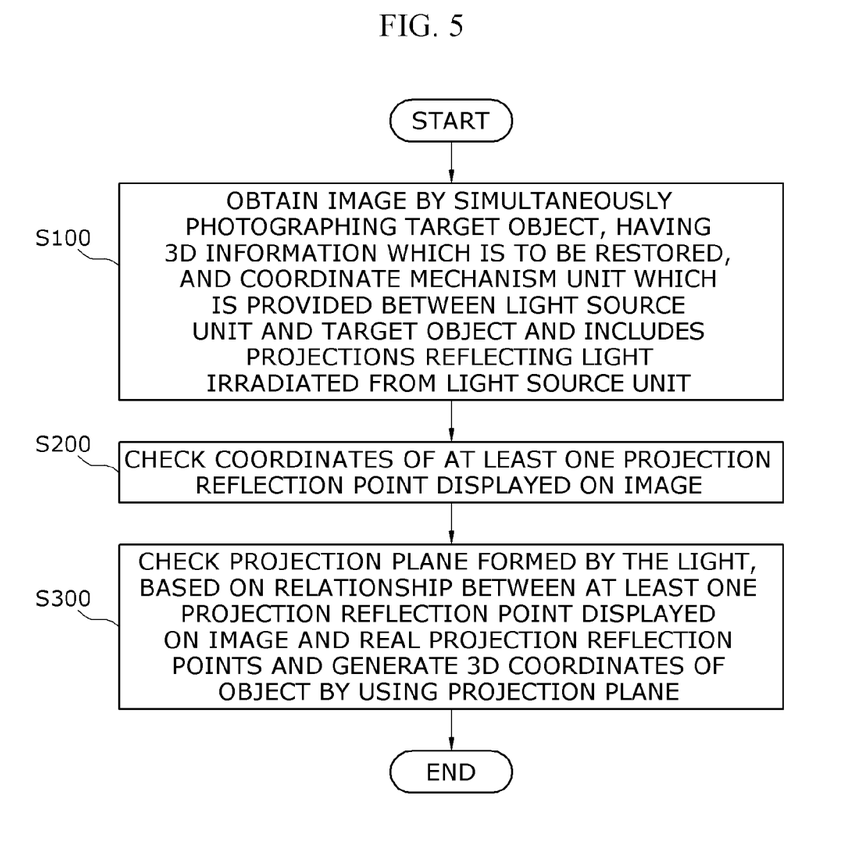
FIG. 5 is a flowchart illustrating a sequence of a 3D information generating method capable of self-calibration according to an embodiment of the present invention.

FIG. 5 is a flowchart illustrating a sequence of a 3D information generating method capable of self-calibration according to an embodiment of the present invention.

The 3D information generating method capable of self-calibration may be performed by the above-described 3D information generating device capable of self-calibration.

First, in step S100, the 3D information generating device capable of self-calibration may obtain an image by photographing a target object having 3D information which is to be restored, based on light emitted from a light source unit.

In this case, a standard mechanism unit including a plurality of projections for reflecting the light emitted from the light source unit may be provided between the light source unit and the target object.

Therefore, the obtained image may include the light emitted from the light source unit, the standard mechanism unit, and the target object, and moreover, may include a projection plane formed by the light, a plurality of reflection projection points reflected by the standard mechanism unit, and a projection plane line where the projection plane is reflected through the target object.

In step S200, the 3D information generating device capable of self-calibration may check coordinates of at least one projection reflection point displayed on the image.

For example, the 3D information generating device capable of self-calibration may extract projection reflection points 38a to 38d displayed on the image and may set 2D coordinates $[u_i \ v_i]$ (i=0, 1, . . . 3) of the points with respect to a coordinate system $[u_C, v_C]$.

Subsequently, in step S300, the 3D information generating device capable of self-calibration may check a relationship between the at least one projection reflection point displayed on the image and a real projection reflection point, based on design information about a real projection.

The 3D information generating device capable of self-calibration may check a projection plane formed by the light, based on the relationship between the at least one projection reflection point displayed on the image and the real projection reflection point and may generate 3D information about the target object by using the projection plane.

For example, the 3D information generating device capable of self-calibration may set a virtual coordinate system $(X_I, Y_I, Z_I)$, based on a real space. The 3D information generating device capable of self-calibration may set an original point in one of the projection reflection points 38a to 38d reflected to a plurality of inclined projections 34a to 34d and may set an X axis and a Y axis on a plane configured by the other points.

Therefore, the 3D information generating device capable of self-calibration may obtain 3D coordinates $([X_i \ Y_i \ 0], i=0, 1, 2, 3)$ of projection reflection points, based on a structure of the coordinate mechanism unit 30. In the method for generating three-dimensional information according to the embodiment of the present disclosure, a point $[x_i \ y_i \ 1]^T(K^{-1}[u_i \ v_i \ 1]^T)$ on the normalized image 200 plane can be expressed by the following equation 9.

Moreover, the 3D information generating device capable of self-calibration may express a point $[x_i \ y_i]^T(K^{-1}[u_i \ v_i \ 1]^T)$ of a normalized image 200 plane as in the following Equation (9):

$$[x_i y_i 1]^T \cong H[X_i Y_i 1]^T \qquad (9)$$

where H denotes a homography 3×3 matrix and may be calculated from $[X_i \ Y_i \ 0]$ (i=0, 1, 2, 3) and $[u_i \ v_i]$(i=0, 1, 2, 3).

In this case, H may be expressed as the following Equation (10) by using a rotation matrix $(R=[r_0 \ r_1 \ r_2])$ and a translation vector (t) between two coordinate systems $[X_I \ Y_I \ Z_I]$ and $[X_C \ Y_C \ Z_C]$.

$$H = [r_0 \ r_1 \ t_3] \qquad (10)$$

The information processing unit 50 may calculate the rotation matrix $(R=[r_0 \ r_1 \ r_2])$ and the translation vector (t) from H by using Equation (10). Furthermore, the information processing unit 50 may set the calculated rotation matrix $(R=[r_0 \ r_1 \ r_2])$ and translation vector (t) to an initial value so as to enhance a degree of precision and may calculate the rotation matrix $(R=[r_0 \ r_1 \ r_2])$ and the translation vector (t) by using a nonlinear optimization method, based on a cost function of the following Equation (11):

$$\sum_{i=0}^{3} \|[x_i y_i]^T - \pi([r_0 r_1 t][X_i Y_i 1]^T)\|^2 \qquad (11)$$

where a function is defined as $\pi([a \ b \ c]^T) = [a/c \ b/c]^T$.

Subsequently, the 3D information generating device capable of self-calibration may calculate a projection plane 207 formed by a line laser, based on relationship information between a real projection reflection point and a projection reflection point in the image.

For example, when $r_2=[r_{02} \ r_{12} \ r_{22}]^T$ and $t=[t_x \ t_y \ t_z]^T$ are assumed, the 3D information generating device may calculate an X1-Y1 plane equation from the rotation matrix $(R=[r_0 \ r_1 \ r_2])$ and the translation vector (t). The X1-Y1 plane equation may be calculated as in the following Equation (12):

$$r_{02}(x-t_x) + r_{12}(y-t_y) + r_{22}(z-t_z) = 0 \qquad (12)$$

Based on a pinhole camera model, a projection line 203 passing through an arbitrary point 202 through which a line laser passes in an image 200 may extend with reference to an original point 201 (see FIG. 2) of a camera coordinate system.

Light emitted by the line laser may form a projection plane 207, and as the projection plane 207 reaches a target object 100, a projection curve 204 of the line laser may be formed along an outer region of the target object 100.

In step S300, the 3D information generating device capable of self-calibration may check an intersection point 205 of the projection line 203 and the projection plane 207 of the line laser, and the intersection point 205 may be determined as one point of a surface of the target object 100.

Based on this, the information processing unit 50 may check points through which the line laser passes in the image 200 and may check an intersection point corresponding to the points to detect coordinates of 3D points of the projection curve 204 corresponding to a point of a surface of the target object 100.

For example, the 3D information generating device capable of self-calibration may define the arbitrary point 202, through which the line laser passes in the image 200, as [u v] and may calculate a direction vector of the projection line 203 passing through the arbitrary point 202 as in the following Equation (13):

$$d \cong K^{-1}[u\ v\ 1]^T \quad (13)$$

where K denotes a camera internal variable matrix defined in a computer vision field, and the camera internal variable matrix may be previously set based on a general camera calibration method. Also, a value of the arbitrary point 202 through which the line laser passes in the image 200 may be reflected in a distortion rate of a lens included in a camera unit, and thus, may be calibrated.

The projection reflection points 38a to 38d may be formed by bringing the plurality of inclined projections 34a to 34d into contact with the projection plane 207, and thus, the plane equation expressed as Equation (12) may match an expression equation of the projection plane 207. Furthermore, the projection plane 207 may form a projection plane line.

Therefore, the 3D information generating device capable of self-calibration may calculate the intersection point 205 of the projection line 203 and the projection plane 207 by using Equation (12) corresponding to the expression equation of the projection plane 207 and Equation (13) representing a direction vector of the projection line 203 passing through the arbitrary point 202.

In the 3D information generating device capable of self-calibration according to an embodiment of the present invention, a 3D scanner may be configured with a simple coordinate reference mechanism unit equipped in a light source unit, a camera unit, and a 3D information processing unit. In this manner, since a complicated mechanism unit installed in the outside is not needed, the 3D information generating device capable of self-calibration according to an embodiment of the present invention may be easily maintained and managed. Particularly, the camera unit and the information processing unit may be included in a mobile device, and the 3D scanner may be easily configured by using the simple coordinate reference mechanism unit equipped in the light source unit and the mobile device.

Furthermore, the 3D information generating device capable of self-calibration according to an embodiment of the present invention may be conveniently calibrated and may be enhanced in degree of precision, and thus, may be easily used by unskilled users.

Figure 6:
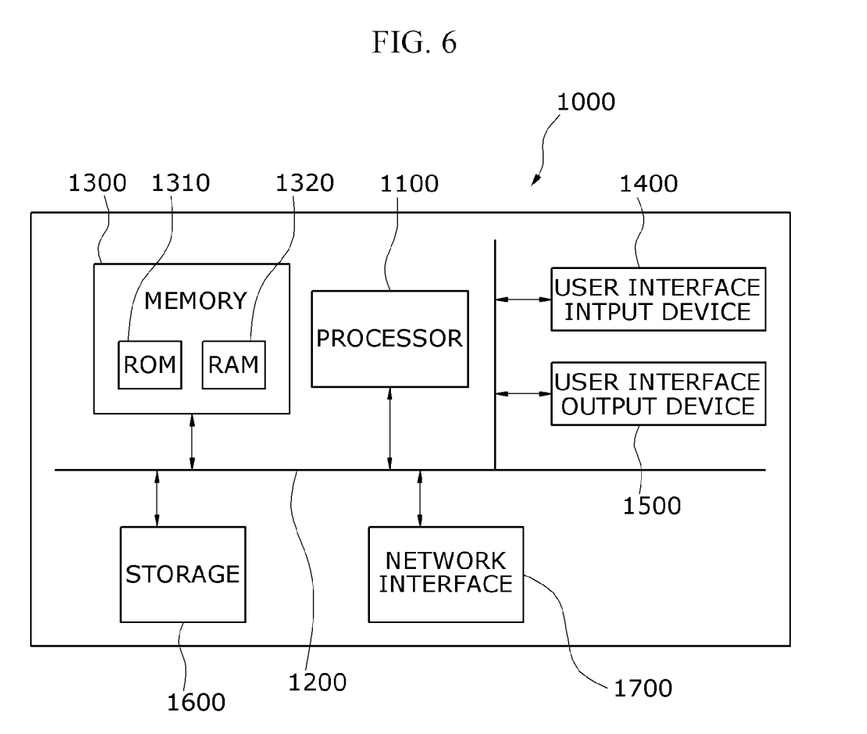
FIG. 6 is a block diagram illustrating a computing system for executing a 3D information generating method capable of self-calibration according to an embodiment of the present invention.

FIG. 6 is a block diagram illustrating a computing system 1000 for executing a 3D information generating method capable of self-calibration according to an embodiment of the present invention.

Referring to FIG. 6, the computing system 1000 may include at least one processor 1100, a memory 1300, a user interface input device 1400, a user interface output device 1500, a storage 1600, and a network interface 1700, which are connected to one another through a bus 1200.

The processor 1100 may be a semiconductor device for executing instructions stored in a central processing unit (CPU) or the memory 1300 and/or the storage 1600. Each of the memory 1300 and the storage 1600 may include various kinds of volatile or non-volatile storage mediums. For example, the memory 1300 may include read only memory (ROM) and random access memory (RAM).

Therefore, a method or a step of an algorithm described above in association with embodiments disclosed in the present specification may be directly implemented with hardware, a software module, or a combination thereof, which is executed by the processor 1100. The software module may be provided in RAM, flash memory, ROM, erasable programmable read only memory (EPROM), electrical erasable programmable read only memory (EEPROM), a register, a hard disk, an attachable/detachable disk, or a storage medium (i.e., the memory 1300 and/or the storage 1600) such as CD-ROM. An exemplary storage medium may be coupled to the processor 1100, and the processor 1100 may read out information from the storage medium and may write information in the storage medium. In other embodiments, the storage medium may be provided as one body with the processor 1100. The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences. In order to implement a method according to embodiments, a disclosed step may additionally include another step, include steps other than some steps, or include another additional step other than some steps.

Various embodiments of the present disclosure does not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

As described above, in the 3D information generating device and method capable of self-calibration according to the embodiments of the present invention, an unskilled user may easily perform a 3D scan operation by using the simply configured coordinate mechanism unit, and moreover, since a coordinate mechanism is not installed in the outside, the 3D information generating device may easily move and may be easily maintained and managed.

Moreover, in the 3D information generating device and method capable of self-calibration according to the embodiments of the present invention, the coordinate mechanism unit for scanning an object may be automatically calibrated, thereby enhancing a degree of precision and reducing the cost and time expended in calibration.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) information generating device capable of self-calibration, the 3D information generating device comprising:
a light source unit to irradiate light onto a target object;
a coordinate mechanism unit disposed between the target object and the light source unit, the coordinate mechanism unit including a plurality of inclined projections reflecting the light;
a camera unit comprising an image sensor that outputs an image obtained by simultaneously photographing the coordinate mechanism unit and the target object;
a fixing arm coupled to the light source unit at one end of the fixing arm and coupled to the coordinate mechanism unit at another end of the fixing arm; and
an information processing unit comprising a processor and a storage medium in communication with the processor, the storage medium storing program code that when executed by the processor checks a projection plane formed by the light of the light source unit and, by using the projection plane, generates 3D information about the target object while calibrating an error.

2. The 3D information generating device of claim 1, wherein the light source unit irradiates two or more laser beams.

3. The 3D information generating device of claim 1, wherein the camera unit are provided in plurality, and the plurality of camera units perform photographing in different directions.

4. The 3D information generating device of claim 1, wherein in the information processing unit the program code when executed by the processor calculates a projection plane, based on projection reflection points reflected by the plurality of inclined projections included in the coordinate mechanism unit.

5. The 3D information generating device of claim 1, wherein in the information processing unit the program code when executed by the processor calculates a projection plane, based on a projection reflection point extracted from an image and projection reflection points reflected by the plurality of inclined projections included in the coordinate mechanism unit.

6. The 3D information generating device of claim 1, wherein in the information processing unit the program code when executed by the processor repeatedly performs an operation, which calculates 3D coordinates of a projection curve, on continual images which are obtained while a laser beam is being irradiated, thereby calculating a 3D scan result representing an appearance of the target object.

7. The 3D information generating device of claim 1, wherein the coordinate mechanism unit comprises:
a fixing plate; and
the plurality of inclined projections arranged at certain intervals on the fixing plate to reflect the light irradiated from the light source unit.

8. The 3D information generating device of claim 7, wherein the plurality of inclined projections are provided on the fixing plate to be inclined in the same direction.

9. A three-dimensional (3D) information generating method capable of self-calibration, the 3D information generating method comprising:
obtaining an image by simultaneously photographing a target object, having 3D information which is to be restored, and a coordinate mechanism unit which is provided between a light source unit and the target object and includes a plurality of inclined projections reflecting light irradiated from the light source unit;
checking coordinates of a plurality of projection reflection points where the light is reflected by the plurality of inclined projections in the image; and
checking a projection plane formed by the light, based on a relationship between the plurality of projection reflection points in the image and real projection reflection points reflected by a plurality of real projections and, by using the projection plane, generating 3D information about the target object while calibrating an error,
wherein the coordinate mechanism unit is coupled to a fixing arm at one end of the fixing arm coupled to the light source unit at another end of the fixing arm.

10. The 3D information generating method of claim 9, wherein the generating of the 3D information while calibrating the error comprises obtaining the image by simultaneously photographing the target object having the 3D information which is to be restored, based on the light emitted from the light source unit, checking coordinates of at least one projection reflection point displayed on the image, and checking a relationship between the at least one projection reflection point displayed on the image and a real projection reflection point, based on design information about a real projection.

11. The 3D information generating method of claim 10, wherein the generating of the 3D information while calibrating the error comprises checking an intersection point of a projection line and a projection plane of a line laser, determining the intersection point as one point of a surface of the target object, and calculating coordinates of 3D points of a projection curve corresponding to the one point of the surface of the target object.

12. The 3D information generating method of claim 9, wherein the generating of the 3D information comprises checking relationship information between the plurality of projection reflection points in the image and the real projection reflection points.

13. The 3D information generating method of claim 12, wherein the generating of the 3D information comprises calculating a projection plane formed by the light, based on the relationship information.

14. The 3D information generating method of claim 12, wherein the generating of the 3D information comprises converting an intersection point of the projection plane and a projection point, which passes through one point of an object displayed on the image from an original point of a camera coordinate system and is projected onto a real object, into at least one 3D coordinate point.

15. The 3D information generating method of claim 12, wherein the checking of the relationship information comprises calculating a translation vector value and a rotation matrix corresponding to coordinate values of the plurality of real projection reflection points and coordinate values of the plurality of projection reflection points displayed on the image.

16. The 3D information generating method of claim 12, wherein the obtaining of the image comprises checking different images captured by cameras provided in different directions.

* * * * *